2,946,155

METHOD FOR IMPROVING SOIL TEXTURE

George B. Barnhill, Oakland, Calif., assignor of twenty-five percent to John N. Adams, Oakland, Calif., and thirty-seven and one-half percent to M. Craig Friel, Oakland, Calif.; Louise S. Barnhill, administratrix of said George B. Barnhill, deceased No Drawing. Filed Aug. 29, 1952, Ser. No. 307,169

1 Claim. (Cl. 47—58)

This invention relates to the treatment of water applied to soils in which plants are growing or in which the growing of plants is contemplated, particularly agricultural crops and vegetables, horticultural crops, lawn and gardens. It has in the main a five-fold purpose:

(a) To improve the texture of soils, particularly soils that tend to become hard and compact, such as clayey and adobe soils;

(b) To effect the adequate irrigation of growing crops with a smaller quantity of water than heretofore employed, thereby effecting, generally, a much-needed conservation of water in regions of scarce water supply, and effecting, specifically, in connection with the growing of certain vegetable crops, a reduction in crop spoilage heretofore caused by irrigation with ordinary water;

(c) To render productive soils which have become non-productive due to the presence of alkali and/or salt;

(d) To abate the health menace which arises from the accumulation of quiescent water in connection with growing crops, such as rice fields, or in connection with activities associated with agricultural crops, such as the washing of lettuce in preparation for market, waste water from sugar manufacture, etc., where the quiescent water affords breeding places for disease-carrying insects such as the malarial mosquitoes (*Culex anopheles*) and the mosquito (*Culex tarsalis*) which carries the deadly encephalitis disease ("brain fever"), and to effect this abatement without rendering the water toxic to growing plants, such as the growing rice crop, but on the contrary rendering the water more beneficial to the growing plants;

(e) To form, in connection with the treated water, a liquid fertilizer for growing plants in which liquid fertilizer there is carried to the root systems of plants through the irrigation or other watering systems plant food material comprising animal and vegetable fats and oils, which as such could not be carried by the untreated water.

All of these purposes may be accomplished simultaneously, or certain of them may be carried out without the others.

In connection with the problems giving rise to the aforesaid purposes or objects of my invention, the following facts are pertinent:

(a) As to the problem relating to soil texture, adobe and clayey soils are often extremely difficult and expensive to till. Vast areas of such soil are found in California and other Western States. In California, for example, the rainy season occurs very largely in the winter months with little or no rain throughout the rest of the year. As the soil dries out after the end of the rainy season there is a comparatively short period of time, lasting not over a week or two as a rule, when it is friable and relatively easy to work. Thereafter the soil rapidly becomes so compacted and hard that the cultivating tool penetrates it with great difficulty and the soil breaks up into enormous clod-like masses, often of thickness equal to the depth of spading or plowing, the pulverizing of which to form a suitable seed bed is attended with considerable expense. Another difficulty attending this compacting and hardening characteristic of abode and similar soils is that manifested by spots of dried grass on lawns. An area, usually small at first, of the soil becomes so compact that the water sprinkled or even poured upon it rolls off almost as it would on the surface of a brick, with the result that the grass on such areas becomes drier and drier and the "hard pan" like area increases in size until such measures as "spiking" the dried-out areas, or soaking them with very slow but lengthy applications of water are resorted to.

Attempts to cope with these and other difficulties attending the compacting and hardening of adobe and similar soils have been made with what are termed soil conditioners, chemicals of one kind or another, many of which have as their base ingredient acrylonitrile, which are intended to keep the soil in a flocculated condition so that it is friable and easy to till. A difficulty with the use of such materials is generally that the soil must first be pulverized whereupon these soil conditioning agents are added and mixed with the soil to keep it in a more or less pulverized or flocculated state much on the same principle that peat moss mixed with soil that has first been pulverized tends to keep the soil in a flocculated state. They do not penetrate compacted and hardened soil to render it friable and therefore their use does not eliminate the cost of an initial mechanical pulverizing of the soil.

(b) As to the problem relating to the saving of water and reduction in vegetable crop spoilage: In the growing of certain vegetable crops in regions where irrigation is depended upon for the necessary moisture, it is the practice to arrange the soil in rows of raised ridges, to grow the plants on the tops of the ridges, and to cause the irrigation water to flow from one end to the other through the furrows between the rows until a sufficient amount of water has been taken up by the soil in the ridges. When the crop so grown is strawberries, the furrows are thus "flooded" with irrigation water after each picking of the berries, and in the case of heavy soil, the wet furrows are slow to dry sufficiently to permit workmen to enter for renewed picking. The wet soil promotes bacterial growth with the result that during the delay that ensues a large quantity of berries ripen and decay before pickers can get to them. This difficulty also attends when the berries are grown in flat beds instead of on ridges.

(c) As to the problem of rendering productive alkaline and/or salty soil that has become non-productive: In certain regions of the western states the soil is not suitable to the growing of crops because of high alkali content. In other localities, such as the delta regions existing where rivers discharge into arms of the ocean, as at the confluence of the San Joaquin and Sacramento Rivers adjacent the San Francisco Bay, the encroachment of salt water toward the surface of the soil becomes a menace to crops grown in the region, since it renders unproductive land that would otherwise be highly productive.

(d) As to the problem involved in the abatement of deadly disease-carrying mosquitoes and other insects which breed in quiescent water which collects in growing rice fields, or collects in connection with other agricultural activities, without at the same time damaging the crops: Among the mosquitoes which breed in the growing rice fields of California, where vast areas of quiescent water exist, is the mosquito (*Culex tarsalis*) which is a vector or carrier for the dreaded disease encephalitis, characterized by "hardening" of the brain, which attacks human beings and horses. The mortality rate in human beings is distressingly high, while in horses it is almost 100%. At the present time this disease is prevalent over a wide area in California where water from excessive spring floods has accumulated in hollows and other depressions over the land in various regions, outside of the rice field regions, and has become stagnant. To aggravate the problem at this particular time the rupture of irrigation systems in Kern County, California, by recent earthquakes has added thousands of acres to the already vast breeding areas of this deadly vector. While in those areas where the quiescent or stagnant water is not in contact with growing crops the materials heretofore used to kill the mosquito larvae, such as emulsions of petroleum oils (kerosene or stove oil as well as less refined oils) and certain manufactured insecticidal chemicals may be employed to combat this menace, these materials would be damaging to growing rice crops and therefore cannot be used in the rice fields without the sacrifice of valuable agricultural crops. Moreover, as entomologists familiar with this menace have stated, even if all the mosquitoes in the extensive areas of stagnant water not in contact with growing crops were killed and the vast areas of nearby rice fields were left untreated, there would be extreme danger that the disease might still continue its ravages due to the strong probability that the mosquitoes bred in the rice fields would be wind-bourne to other regions including those where the mosquitoes had been combatted by the use of prior materials. Thus the only hope of cooperation from the rice growers lies in providing a material that will destroy the mosquito larvae and at the same time not damage the rice.

(e) As to the problem of carrying to the root systems of growing plants through the irrigation water animal and vegetable fats and oils as liquid fertilizer: The progress which has been made in recent years in the manufacture and sale of synthetic detergents to replace soap has brought about a situation in which vast quantities of fats and oils which formerly were used in the manufacture of soap now exist more or less as a "drug on the market." A very urgent problem therefore confronts the animal and vegetable oil industry, particularly that phase of it wherein the non-edible fats and oils accumulate—the economical disposal of this material, such as the channeling of it into some other market. Fats and oils have great value as plant food. In their decomposition through the action of sunlight, soil, water and bacteria, they disintegrate into free fatty acid which can be taken up by the root systems of growing plants. But to transport the vast quantities of these fats and oils now waiting for disposal to the soil in which the plants are growing, or first to convert them to free fatty acids and then transport the latter to the growing plants, would involve cost and other factors of such magnitude as to remove from consideration such methods of disposal. On the other hand, if these fats and oils can be made water bourne, as via the irrigation or other watering systems, a ready means would be available for its disposal and a highly valuable plant food would be made available to all kinds of growing plants.

In addition to the purposes and objects of this invention as hereinabove set forth, other objects and advantages will be apparent from the following description.

I have discovered that by treating the water that is used for irrigation or to otherwise water growing plants with surface active or wetting agents, such as are typified by alkyl-aryl sulfonates, alkyl sulphates and alkyl phosphates, there can be accomplished the following advantageous results:

(a) The treated water when applied to soils which tend to compact and harden upon loss of moisture, particularly soils of an adobe or clayey nature, causes such soils to be rendered substantially permanently loose and friable and easily pulverizable without the heavy labor and expense of an initial and difficult mechanical pulverizing operation;

(b) The amount of water required to provide the growing crops with an adequate supply of moisture can be materially, and therefore economically, decreased as well as a substantial conservation of water effected, and that in connection with the growing of certain crops in adobe or clayey soils, such as strawberries, the resulting decreased moisture environment effects a substantial reduction in the loss of fruits from spoilage on the growing vines;

(c) In soils which otherwise would be highly fertile but which, by the action of alkali, such as accumulates in many western soils, or by the action of salt resulting from salt water encroachment in regions in close proximity to sea water, have become barren for agricultural crops, the alkali or saline content of the soil can be depressed or driven down below the root system of growing plants, thus restoring the productive capacity of such soils;

(d) In regions where the growing crop is in contact with quiescent water which affords breeding places for mosquitoes or other disease carrying insects the larvae of such insects can be killed and the insect menace from such sources overcome without the danger of damaging the growing crop, but on the other hand actually benefitting both the crop and the soil upon which it grows; and (e) Fats and oils, of animal or vegetable source, which are emulsifiable by the water treating agents which I employ, can upon emulsification with said agents, be bourn by the treated irrigation water directly to the soil where the plants are growing, where, upon breaking down to free fatty acids by their natural decay, they become available as plant food to the root system of the growing plants, and thus the emulsified fats and oils together with the treated water constitute a liquid fertilizer material for growing crops.

By way of illustration of the practical application of this invention, the following examples are given:

*Example 1*

In a locality in California where the soil is a very heavy, black adobe, and at a consideable period of time in the summer after the rainy season had ended and the soil had become quite compacted and hard, it was desired to establish a lawn in connection with a newly built house. Instead of going through the laborious process of pulverizing the large chunks ordinarily found upon spading the soil, screening out the large proportion of unpulverized soil, and mixing in loam or sand, or both, and peat moss to obtain a bed deemed suitable for seeding, there was applied to the soil, before spading, an aqueous solution containing 25 percent by weight of sodium dioctyl phosphate from a sprinkling can at the rate of one gallon of the said solution per 1,000 sq. ft. (equivalent to 2.1 pounds of the active ingredient, per 1,000 sq. ft., or slightly over 90 pounds per acre).

In a period of a few hours this adobe soil became friable and was easily worked into a fine seed bed, no loam or sand being used. A luxuriant lawn was obtained and no "Hard pan" like patches were experienced, as is often the case, during the long summer months. Whereas in heavy adobe soil it usually requires about three weeks to get a good stand of new lawn grass, in this case a vigorous stand was obtained in two weeks.

*Example 2*

A lawn that had been planted in abode soil had begun to dry out, so much that a considerable portion of it had a parched appearance as if the grass were dying. There was applied to this lawn an aqueous solution containing 12.8% by weight of a sodium alkyl aryl sulfonate at the rate of 1 gallon per 1,000 sq. ft. (equivalent to approximately 44 gallons per acre; also to about 47 pounds of the active ingredient, sulfonate, per acre), after which the lawn was watered at the usual rate.

In a few days it had begun to take on a greener appearance and in about two weeks it was uniformly green, with no dried up areas. The soil had become loose so that sprinkling water was absorbed instead of rolling off the former hard surface.

On another lawn which was in similar condition this same sodium alkyl aryl sulfonate was applied to one section only of the lawn, at one-half of the above rate or equivalent to about 23 pounds of the active ingredient per acre. The entire lawn was then watered in the usual manner at the same regular intervals. After 2½ weeks there was a very definite line of demarkation between the section to which the sulfonate had been applied and the balance of the lawn, the grass on the first section being much greener and more thrifty than on the rest of the lawn.

*Example 3*

In a tract of heavy clayey soil in which lettuce, broccoli and sugar beets are grown in ridged rows with irrigation furrows between the rows it ordinarily requires water in quantity equal to a depth of 4 inches per acre in order that the water introduced at one end of the irrigation furrows may flow to the opposite end of the furrows so as to water the plants at that end. When there was added to the irrigation water an aqueous solution containing 12.8% by weight of sodium alkyl aryl sulfonate at the rate of 7½ gallons of the solution per acre (equivalent to 8 pounds of the sulfonate per acre), considerably less quantity of water was required in order for it to reach the ends of the irrigating furrows— only 1.7 inches per acre as compared with the prior 4 inches per acre.

*Example 4*

In a region of heavy, clayey soil where strawberries are grown in ridged rows, and where irrigation by flooding the furrows between the rows follows each picking of the berries, it was found that by adding to the irrigation water an aqueous solution containing 12.8% by weight of a sodium alkyl aryl sulfonate at rates such that from 7½ to 15 gallons of the sulfonate solution would be distributed to an acre of the land (equivalent to from 8 to 16 pounds of the sulfonate per acre), the plants could be adequately watered with much less water than had been required—in the neighborhood of about ⅓ the former amount in some instances—and that the time required for the soil in the furrows to dry sufficiently that workmen could get in to renew the picking was reduced to from ⅓ to ½ of that which had theretofore been required. Moreover, due to the more frequent pickings thus permitted, a very substantial loss of ripened berries formerly experienced from the delay and the exposure of the crop to bacterial growth to the wet soil was prevented.

*Example 5*

A tract of heavy clayey soil located in California had become so strongly alkaline that attempts to grow barley on it had yielded only spindly plants with a mediocre crop. This tract was again seeded to barley and when the plants were about 4 inches high it was flood irrigated with water in which there was added, at the rate of 1.8 gallons per acre of land covered, an aqueous solution containing 25% by weight of sodium dioctyl phosphate (equivalent to about 3¾ pounds per acre). A very good yield of barley was obtained.

*Example 6*

In the delta region at the confluence of the Sacramento and San Joaquin Rivers in California there are vast areas of exceedingly fertile soil except for the fact that salt water encroachment from the ocean water of San Francisco Bay (said salt water encroachment being accentuated by the tidal movements of the water in San Francisco Bay), renders a great deal of the land sterile for the production of agricultural crops. In parts of this region devoted to the growing of such crops as asparagus, tomatoes and sugar beets the problem is attacked by first lowering the salt water level by the use of large pumps which take suction in the soil and discharge the salt water into deep trenches which traverse the tract. This is followed by the application of fresh water from overhead sprinkler systems. This method of watering is practiced rather than flood irrigation in order to assure that the fresh water shall not go down to a depth where it joins the saline water table, for if that should occur then by capillarily, etc., the salt would again rise and damage the root system of the growing crop. Watering by overhead sprinkling gives greater control in this respect than would be afforded by flood irrigation. As illustrative of this it has been found that when pasture land in the delta region has been flood irrigated the salinity often rises and the grass becomes fallow. A factor which governs the successful growing of crops in soil thus contaminated is the depth of penetration of the sprinkling water applied, since the greater the penetration the more the assurance that the soil is rid of residual salinity. In a certain tract of this land where sugar beet seed had been planted to a depth of 1½ inches, a given quantity of fresh water sprinkled upon a given plot was found to have penetrated only to about the depth of the planted seed—not enough to give good germination of the seed and afford moisture for the developing root systems of the plants. On another plot of the same size the same quantity of fresh water was applied but to this water there had been added an aqueous solution containing 12.8% by weight of a sodium alkyl aryl sulfonate at the rate of 15 gallons of said solution per acre of land covered by the water (equivalent to 16 pounds of the sulfonate per acre of land covered). The water reached a penetration of six inches below the surface of the soil. On still another plot of equal size there was added to the same quantity of fresh water the sodium alkyl aryl sulfonate at the rate of 3¼ pounds per acre of land covered (i.e., at half the rate on the preceding plot). This was also found to have penetrated to a depth of six inches, and indicated that the depth of penetration on the preceding plot would have gone to a much greater depth had more sprinkling water been used.

In connection with the abatement of the mosquito menace, the larva stage of the insect's life cycle is spent just below the surface of the water and when the insect reaches maturity the adult, to become air-bourne, must emerge through the surface film of the water. As a result of the admixture of my surface active agents with the water in which the larvae exist, the larvae and/or the adult insect becomes wetted so that the adult insect is unable to emerge from the water, and drowns. This fatality to mosquitos has been found to occur with an amount of surface active agent considerably less than the amounts used for improvement in soil texture and plant culture as in the examples set out hereinabove— amounts as low as 5 parts per million of water with which it is admixed, in the case of the sodium alkyl aryl sulfonate. This is assurance that a highly effective dosage can be employed for the mosquito abatement purpose without damage to crops or other plants that may be growing in the infested water (as in the case of rice), and without fear of damage to crops with which water thus treated for mosquito abatement may afterwards come in contact, as in the case of waste water from flood irrigation, water that has overflowed regular irrigation channels, water accumulating from lettuce washing, waste water from sugar manufacturing plants, etc.

Another instance of the insecticidal action, and consequent riddance of a very harmful economic pest, is in the case of nematode infested soil. The nematode has a waxy coating over its body which is attacked by the detergent action of the agents which I admix with the irrigation water. If not altogether fatal to the nematodes, it acts as a severe retardant to their ravages. The infestation of these insects is often great in soil where sugar beets are grown, which is often in heavy adobe or clayey soil. Thus while effecting improvement in soil texture in which the beets are grown, with a consequent better beet crop, the use of my material effects certain insect pest control and therefore is doubly beneficial.

In the making of animal and vegetable fats and oils water-bourne through their emulsification with the agents which I employ for my water treatment, and the admixture of the emulsified fats and oils with the treated water whereby the valuable liquid fertilizer effect is added to the other beneficial effects obtained when the treated water is conveyed to the soil, use is made of the well-known detergent properties of the agents I employ for my water treatment and no difficulty is presented in emulsifying the fats and oils. Fats of animal origin constitute a large proportion of the available supply and since much of it is in solid form it is melted before the detergent is introduced by bringing it to a temperature of about 160° F. Various methods may be used to introduce the detergent, but I have found it very convenient and satisfactory to heat the detergent along with the fat, stirring in the detergent while the fat is melting. I have obtained satisfactory dispersion (emulsification) of mixed fat from meat trimmings from a conventional meat market by using an aqueous solution of a sodium alkyl aryl sulfonate, containing 12.8% by weight of the sulfonate, in the ratio of one part of the said aqueous solution to ten parts of the fat. Neither vigorous agitation nor higher temperatures contributed toward the emulsification, moderate stirring and a temperature of around 160° F. being sufficient. Certain fats and oils require more of the detergent for their emulsification than others. Of the animal fats, sheep tallow is the hardest to emulsify, while lanolin (fat from wool) emulsifies easily. "Leaf" fat from around the kidneys is more difficult to emulsify than inter-intestinal fat. Of the vegetable oils, cotton seed oil, cocoanut oil, corn oil, sesame oil and peanut oil are all easily emulsified and are about on a par with mixed animal fat; while vegetable oils with a high iodine value, such as castor oil, palm oil, linseed oil, babassu oil—drying oils—are more difficult to emulsify—more so than sheep tallow.

By the emulsification of fats and oils with small amounts of aqueous solution of the surface active agents which I employ for my water treatment, the fats and oils are put into workable physical condition for being fed or introduced into the treated irrigation water which is applied to the soil for soil texture improvement and the other plant cultural purposes. Any emulsifying agent, however, may be employed for the emulsification of the fat and oils which is compatible with the surface active agents employed for the water treatment, so that the emulsion will not break when it is admixed with the treated irrigation water. The fat emulsions prepared in accordance with this invention may be stabilized by any of several well known methods, e.g., by including well known protein stabilizers such as homogenized blood, and casein products. The manufacture and utilization of such stabilizers are well known for purposes of stabilizing emulsions to prevent breaking of the emulsion upon contact with the soil. The emulsion may be introduced into the treated irrigation water at any desired rate, depending upon the degree to which the fertility of the soil is to be increased. The treated water, in serving as the medium in which the fat is dispersed, loses none of its potency to flocculate and otherwise improve soil texture and plant culture. Thus the treated water assists in carrying the fats and oils deeper into the soil so that the plant food resulting from their decomposition is more extensively distributed to the root systems of growing plants.

It is not detrimental to this water-bourne or liquid fertilizer factor if the fats or oils that accumulate for lack of disposal may have become rancid before emulsification. The rancid products are also water bourne by the treated water and the availability of the fats or oils for plant food is hastened by reason of the fact that the material is further along toward the ultimate free fatty acid end-products to be assimilated by the plants. In this connection the extract from filter clay that has been used in the refining of vegetable oils is a good product to emulsify with the water treating agents which I employ.

In fact, there is a secondary advantage in conveying to some soils and crops rancid fats, namely, those which are infested with certain insects which live in the soil, such as nematodes. In addition to the fact that the surface active agents tend to destroy the waxey coating around the bodes of these insect pests as hereinabove explained, it has been found that free fatty acids resulting from the desintegration of animal and vegetable fats are toxic to nematodes. Also, as stated above, these insects are often a problem in the growing of sugar beets, and in regions of adobe or clayey soils, as in California, the introduction into the treated irrigation water of emulsified fats and oils, whether the rancid products are then present or form after the fats have been water bourne into the soil, further enhance the doubly beneficial effects of my water treatment—the beets thrive because of better soil texture and the ravages by nematode pests is decreased by the toxic effect thereon of the free fatty acids as well as by impairment of the waxy coating on the body of the insects. This same double beneficial effect is manifested in the growing of melons, squash, cucumbers and certain kinds of pumpkins where the absorption of free fatty acids through their root system makes them resistant to mildews and other fungus diseases. Stemrust on wheat is another example, particularly if the fatty acid is taken up by the plants before the developing kernels have reached the "milk" stage, and the use of the detergent-fat emulsion in the irrigation water offers remedial measures for effective control.

The admixture of emulsified fats and oils with the treated irrigation water gives rise to still another great advancement in plant culture. There has heretofore been a lack of an adequate carrier and distributing agent by which vitamins and hormones useful to plant growth may be conveyed to the root systems of growing plants; and this lack has retarded the use of these growth promoting materials. All members of the group of vitamins represented by thyomine chloride hydrochloride, and allied substances, as well as growth promoting hormones, are effectively and evenly distributed to the root systems of crops when introduced into the treated irrigation water in which there is admixed the emulsion of animal or vegetable fats or oils. The free fatty acids which result from the decomposition of the fats is very beneficial to hormones; in fact they thrive in such material. On the other hand, they are harmed by alkalies and alkaloids. Likewise, the water treated with the detergent-fat emulsion serves as a carrier and distributing agent to soils for those bacterial cultures whose activity in the soil is beneficial for plant culture.

As has been hereinabove set forth, the concentration of the surface active agents in aqueous solution for mosquito and other insect abatement control, and for the emulsification of fats and oil to enable them to be waterbourne as a liquid plant fertilizer, is well within the range of concentrations employed when these agents are in admixture with the water that is to be applied to the soil for improvement of soil textures, depressing saline and salt content in the soil, etc.

The quantity or concentration of the surface active agents which may be employed in the irrigation water varies over a very wide range. Rather high concentrations may be employed without toxic effect to plant life. In general materials of this nature which in concentrations in aqueous solutions high enough to kill a plant if applied to its leaves, may be applied in the soil about its root system without injury. In the case of a sodium alkyl aryl sulfonate where the aryl constituent was benzine and the alkyl part was polypropylene an aqueous solution containing 12.8 percent of the sulfonate has the consistency of thin mayonnaise and when a 50–50 water dilution of this concentration was applied to the aerial part of flowers the plants died, but when applied to the soil in which the flowers were growing and followed by a moderate amount of sprinkling water, the plants thrived. In agricultural crops growing in heavy adobe or clayey soil a very satisfactory soil texture and crop production can be attained with the aforesaid sodium alkyl aryl sulfonate when applying a 12.8% (by weight) aqueous solution of the sulfonate at the rate of 20 gallons per acre, (equivalent to slightly less than 22 pounds of the sulfonate per acre), along with the amount of water normally applied for irrigating the land. With an amount of irrigation water equal to a depth of six inches over the land this is equivalent to about 16 parts per million of irrigation water by weight. Considerably higher concentrations have been used with satisfactory results. For example, the above referred to 12.8% solution of the sodium alkyl aryl sulfonate has been used upon lawns at the rate of 50 to 60 gallons per acre of area covered, followed by the conventional amount of sprinkling water, with very good results. In the aforementioned salt water encroachment areas in the delta region of the San Joaquin and Sacramento rivers in California, from 7½ to 15 gallons of the 12.8% solution of the sodium alkyl aryl sulfonate per acre, equivalent to from about 8 to 16 pounds of the sulfonate per acre, introduced into the conventional amount of sprinkling water used has given very satisfactory results. Where alkalinity in the soil is high, the dosage, using this same surface active agent, may be increased to 30 gallons per acre. All of these dosages, when the usual amount of irrigation water is employed, are far below that which would have any detrimental toxic effect upon the plants. The presence of minerals that produce "hardness" in water affects to some degree the penetrability into soils by the treated irrigation water. When the hardness is due to magnesium, lithium or sulfur the treated water penetrates more readily and generally less of it is required than when calcium, sodium or other salts of high surface tension are present.

In examples 2, 3, 4 and 6, hereinabove given, reference is made to a sodium alkyl aryl sulfonate. The sulfonate used was obtained by diluting with water a product of Oronite Chemical Company of San Francisco, California, known as Detergent Slurry, the dilution being at the rate of 1 volume of the Oronite Slurry to 1½ volumes of water and the diluted product having the following analysis, the percentages being by weight:

| | |
|---|---|
| Sulfonate | percent__ 12.8 |
| Sodium sulfate | do____ 1.9 |
| Water | do____ 85.1 |
| Iron (as Fe) | p.p.m__ 20 |
| pH | 9.9 |

The sulfonate of this product, which is the active ingredient referred to in the specific examples, is prepared in the manner described in U.S. Letters Patent 2,477,383 to Allen H. Lewis, granted July 26, 1949. As set forth in that patent, an olefin polymer, e.g., a propylene polymer, is prepared. Benzene is alkylated with this polymer. The alkylation product is fractionated and a suitable fraction sulfonated and then neutralized with sodium hydroxide. The propylene polymer employed is preferably a fraction containing from 12 to 15 carbon atoms.

While I employ sulfonates of this character, i.e., the sodium or other alkali metal salts of sulfonated phenyl alkanes in which the alkane group is a selected olefin polymer prepared in accordance with the procedure of said Lewis patent and containing a branched chain of 12 to 15 carbon atoms, other surface agents may be employed for the purposes of this invention, provided they are compatible with the intended use and are not harmful to growing crops.

Examples of other suitable surface active agents are as follows:

*Alkyl aryl sulfonates.*—In addition to the aforesaid preferred Oronite Chemical Company's Detergent Slurry, alkyl aryl sulfonates generally, of the formula R.Ar.SO$_3$M may be used wherein Ar is an aryl nucleus, R is an oil-solubilizing substituent, and M is a metal which forms a water-soluble salt with the acid radical of the molecule. For example, the Nacconols may be employed. Naccanol is a trademark of the National Aniline Division of the Allied Chemical and Dye Corporation, New York, N.Y., applied to surface active agents described by Schwartz and Perry, "Surface Active Agents," Interscience Publishers, Inc., New York, 1949, page 122, as products of condensing a chlorinated petroleum fraction with benzene and sulfonating the condensation product. A particular example of a suitable Nacconol is that whose mode of preparation is described on page 122 of Schwartz and Perry, commencing with the selection of a kerosene derived from a Pennsylvania crude and having an aniline point of 200 to 300°. Other examples of alkyl aryl sulfonates are NOPCO 1067 and NOPCO 1086–C (Nopco is a trademark of National Oil Products Co., Harrison, N.J.) and which are described in the aforesaid Schwartz and Perry's "Surface Active Agents," page 123; and Ultrawet (trademark of Atlantic Refining Co., Philadelphia, Pa.) which is described in the Schwartz and Perry's "Surface Active Agents," page 310; also Santomerse No. 1, Santomerse D, (Santomerse is a trademark of Monsanto Chemical Co., St. Louis, Missouri), which are described in Schwartz and Perry's "Surface Active Agents" on page 123, and other of the Santomerse products.

*Alkyl Phosphates.*—Sodium dioctyl phosphate and other similar alkali metal alkyl phosphates, e.g., Tergitol wetting agent P–28 (Tergitol is a trademark of Carbide and Carbon Chemicals Co.), which was the product used in Examples 1 and 5 hereinabove.

*Alkyl amide sulfonates.*—For example the product known as Antaron L–520 (trademark of General Aniline and Film Corp.) and is described in an article by John W. McCutcheon entitled "Synthetic Detergents Up to Date" in the journal "Soap and Sanitary Chemicals," August, 1949. As there described, Antaron L–520 is the reaction product of palmityl chloride and cyclohexyltaurine in caustic. Further information about this product will be found in "Industrial and Engineering Chemistry," vol. 43, April 1951, pages 866–71.

*Alkyl Sulfates.*—For example Tergitol Penetrant 08, (Tergitol is a trademark of Carbide and Carbon Chemicals Co.) which is an aqueous solution containing 38% of sodium octyl sulfate. This product is described at page 14 in Chemical Material Catalog, edition of 1951–52, published by Reinhold Publishing Corp., in New York. Sodium lauryl sulfate is another example.

*Alkyl aryl polyether alcohols.*—For example Triton X–100 and Triton X–45. (Triton is a trademark of Rohm and Haas Co., Philadelphia, Pa.)

What is claimed is:

A method of treating soils which comprises providing an equous dispersion of an alkali metal salt of an alkyl substituted phosphorus acid and applying said dispersion to soil in a quantity sufficient to alter substantially the texture of the soil.

References Cited in the file of this patent

UNITED STATES PATENTS

| | | |
|---|---|---|
| 847,749 | Ellis | Mar. 19, 1907 |
| 1,130,136 | Corti | Dec. 8, 1914 |
| 1,228,361 | Hayden | May 29, 1917 |
| 1,601,954 | Freise | Oct. 5, 1926 |
| 1,810,802 | Travers | June 16, 1931 |
| 2,284,002 | Lontz | May 26, 1942 |

(Other references on following page)

UNITED STATES PATENTS

| | | |
|---|---|---|
| 2,314,091 | Jones | Mar. 16, 1943 |
| 2,345,905 | Sullivan | Apr. 4, 1944 |
| 2,350,709 | Adams | June 6, 1944 |
| 2,468,329 | Haycock | Apr. 26, 1949 |
| 2,550,371 | Naps et al. | Apr. 24, 1951 |
| 2,552,775 | Fischer et al. | May 15, 1951 |
| 2,558,772 | Moore | July 3, 1951 |
| 2,594,135 | Denny | Apr. 22, 1952 |
| 2,614,917 | Zukel et al. | Oct. 21, 1952 |
| 2,624,662 | Erickson et al. | Jan. 6, 1953 |
| 2,625,529 | Hedrick et al. | Jan. 3, 1953 |
| 2,683,658 | Saunders et al. | July 13, 1954 |
| 2,689,173 | Clarke | Sept. 14, 1954 |

OTHER REFERENCES

Fatty Acids and Their Derivatives, A. W. Ralston, published by John Wiley and Sons, Inc., N.Y., pp. 752–53.